United States Patent [19]

Torner et al.

[11] 3,893,704
[45] July 8, 1975

[54] VEHICLE BODY OCCUPANT RESTRAINT BELT ARRANGEMENT INCLUDING DOOR MOUNTED BUCKLE

[75] Inventors: Charles H. Torner, Rochester; Richard F. Carella, Mount Clemens, both of Mich.

[73] Assignee: General Motors Corporation, Detroit, Mich.

[22] Filed: Sept. 27, 1974

[21] Appl. No.: 510,123

[52] U.S. Cl. ................ 280/150 SB; 280/150 SB X
[51] Int. Cl. ........................................... B60r 21/10
[58] Field of Search ............ 280/150 SB; 180/82 C; 297/388, 389

[56] References Cited
UNITED STATES PATENTS

| | | | |
|---|---|---|---|
| 2,852,270 | 9/1958 | Hunt | 280/150 SB |
| 3,295,862 | 1/1967 | Ebert | 280/150 SB |
| 3,318,634 | 5/1967 | Nicholas | 280/150 SB X |
| 3,321,244 | 5/1967 | Davies | 280/150 SB X |
| 3,841,658 | 10/1974 | Singh | 280/150 SB |

*Primary Examiner*—Robert R. Song
*Attorney, Agent, or Firm*—J. A. Kushman

[57] ABSTRACT

A restraint belt arrangement with a buckle mounted by a slide assembly on a vehicle body door for movement between retracted and extended positions relative to the door. A restraint belt secured inboard of a seat laterally adjacent the door has a male latch member secured thereto and received by the buckle to secure the belt across an occupant of the seat. A spring normally biases the buckle to the extended position located forwardly and upwardly from the retracted position so that the buckle is readily accessible for an occupant to insert the latch member. A manual effort against the spring bias moves the buckle to the retracted position in a downward and rearward direction to locate the belt in a restraining position, and a first detent secures the buckle in the retracted position upon movement thereto. When belt use is no longer needed, actuation of an inside remote release handle connected to an uncoupling type door lock associated with the door causes a first connecting arrangement to release the first detent and thereby allows the spring to return the buckle to the extended position. An automatic release arrangement releases the latch member from the buckle when the buckle reaches the extended position. A second detent holds the buckle in the extended position until the latch member is again secured to the buckle, and a second connecting arrangement then actuates the second detent to again allow the buckle to be manually moved to the retracted position so the belt is positioned in its restraining position.

5 Claims, 11 Drawing Figures

PATENTED JUL 8 1975 3,893,704

VEHICLE BODY OCCUPANT RESTRAINT BELT ARRANGEMENT INCLUDING DOOR MOUNTED BUCKLE

BACKGROUND OF THE INVENTION

This invention relates generally to a restraint belt arrangement for restraining a seated occupant within a vehicle body.

Current production automotive vehicles include occupant restraint belt arrangements for restraining the vehicle occupants in seated position during vehicle use. The restraint belt arrangements presently in use include a lap belt which generally extends across the occupant's lap. Usually, the lap belt is formed into two portions, one of which attaches a female buckle and the other of which attaches a male latch member or D-ring that is received by and secured to the buckle to thereby secure a belted occupant. Usually, the male latch member also attaches one end of a shoulder belt which extends upwardly and diagonally across the occupant's chest to restrain the upper torso portion of the occupant. One of the lap belt portions is generally longer than the other and this longer one, as well as the upper end of the shoulder belt, are secured to the vehicle body by belt retractors which permit belt storage when belt use is not required. The lap belt retractor which receives the longer lap belt portion is generally secured to the vehicle floor and the shorter lap belt portion is likewise usually secured to the vehicle floor. The shoulder belt retractor may be secured to the vehicle floor. The shoulder belt retractor may be secured to the vehicle roof with a guide on the seat locating the belt relative to the occupant's shoulder.

It has also been known in the past to provide vehicle bodies with restraint belt arrangements that are of the "passive" type in that they require no deliberate effort on the part of the occupant to initiate belt use once an occupant is seated within the vehicle. Most of these types of belt arrangements utilize a belt that extends between an inboard portion of the seat and a laterally adjacent door whose closing movement causes the belt to be moved to an occupant restraining position. With these types of arrangements, the belt always extends across the occupant and there is no buckle and latch member provided since the intent is to insure use of the belt. This type of passive belt arrangement is shown by the following U.S. Patents: Weststrate U.S. Pat. No. 3,679,229; Keppel et al U.S. Pat. No. 3,680,883; Weststrate U.S. Pat. No. 3,684,310; Fancy U.S. Pat. No. 3,694,002; Wize U.S. Pat. No. 3,700,258; Wize U.S. Pat. No. 3,727,944; Cataldo et al U.S. Pat. No. 3,754,776; and Hammer U.S. Pat. No. 3,770,294, all of these foregoing patents being assigned to the assignee of the present invention.

Vehicle body doors used with vehicles having restraint belt arrangements, whether of the "passive" type or not, utilize door locks for selectively maintaining the doors in closed positions. These door locks are connected to both inside and outside remote release handles to permit unlatching thereof for opening door movement when the locks are positioned in unlocked conditions. Actuation of an outside key cylinder or an inside lock control member of the door will cause the lock to be positioned in a locked condition so that the actuation of either handle will not unlatch the door lock. The door lock may be of the "blocking" type in which this locked condition prevents the release handles from being moved to their actuated positions to cause unlatching. The door locks may also be of the "uncoupling" type in which the locked condition uncouples the handles from the latch mechanism of the door lock so that the handles still may be moved to their actuated positions but are ineffective to provide the unlatching of the door locks. The U.S. Patents of Cockburn U.S. Pat. No. 3,695,663 and Campbell et al U.S. Pat. No. 3,703,308, both of which are assigned to the assignee of the present invention, disclose vehicle body door locks of the "uncoupling" type and are hereby incorporated by reference.

SUMMARY OF THE INVENTION

One feature of the present invention is that it provides an improved vehicle restraint belt arrangement including a female buckle mounted on a vehicle body door by a slide assembly for movement between retracted and extended positions relative to the door, with a releasable first detent for holding the buckle in the retracted position so as to secure a latch member attached to a restraint belt at a location positioning the restraint belt across a seated vehicle body occupant in a restraining position, and with the buckle being biased to the extended position upwardly and forwardly from the retracted position so as to be readily accessible to the seated occupant for initially receiving the latch member to initiate attachment and use of the restraint belt. Another feature of the invention is that the restraint belt arrangement is used with a door having an uncoupling type door lock that is unlatched by an inside remote handle connected to the door lock, and a connecting arrangement extends between the inside remote handle and the detent which maintains the buckle in the retracted position so as to release this detent upon actuation of the handle to unlatch the door lock, and this release of the detent allows the bias of the slide assembly to move the buckle to the extended position. Another feature of the invention is that a second releasable detent on the slide assembly holds the buckle in the extended position so as to maintain the buckle accessible to the occupants, and a second connecting arrangement extends between the second detent and the buckle so as to release the second detent upon securement of the belt attached latch member to the buckle and thereby allows a manual effort to move the buckle to the retracted position against its bias so that the belt is positioned in the occupant restraining position. Another feature of the invention is that a third connecting arrangement extends between the slide assembly and the door lock and is responsive to movement of the buckle between retracted and extended positions so as to uncouple the door lock from the inside remote handle to prevent unlatching of the door lock when the buckle is in the retracted position and so as to connect the door lock to the inside remote handle to permit unlatching of the door lock when the buckle is in the extended position. Another feature of the invention is that a release arrangement extends between the buckle and the slide assembly so as to automatically actuate the buckle to release the latch member and the belt when the slide assembly returns the buckle to the extended position.

BRIEF DESCRIPTION OF THE DRAWINGS:

The above specified features and other features, objects and advantages of the present invention are readily apparent from the following detailed description of the preferred embodiment and the drawings in which.

DETAILED DESCRIPTION OF THE PREFERRED EMBODIMENT

Figure 1:
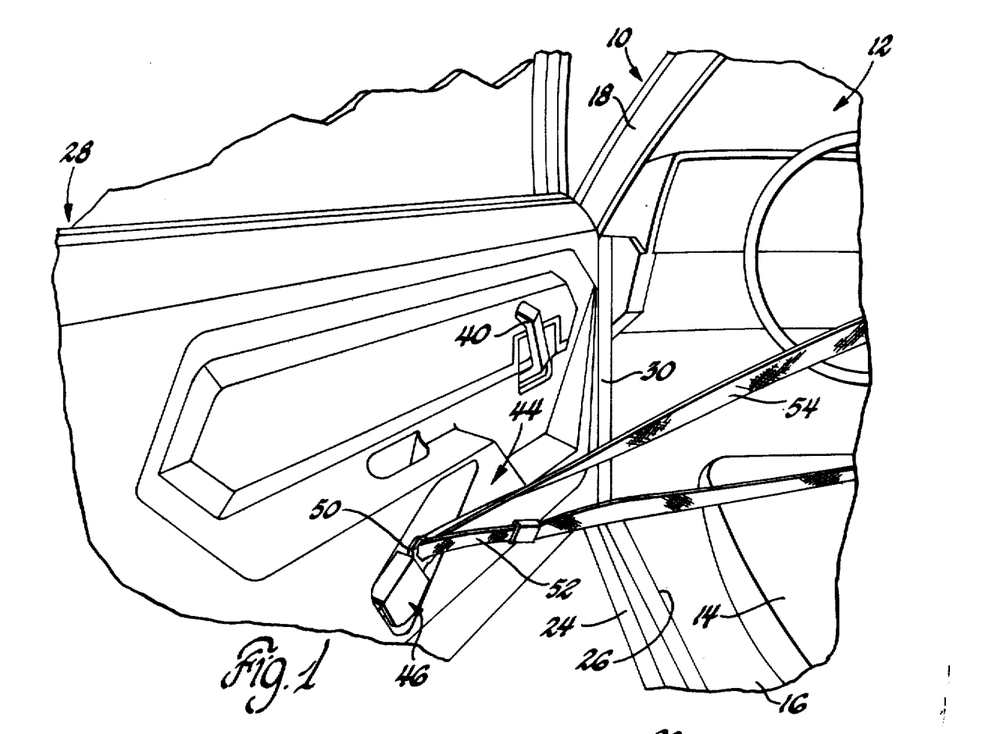
FIG. 1 is a perspective view of a vehicle body whose door slidably supports a female buckle of a restraint belt arrangement, according to this invention, so that the buckle may receive a latch member and move to a retracted position to position a belt attached to the latch member in an occupant restraining position when the door is closed.
Figure 2:
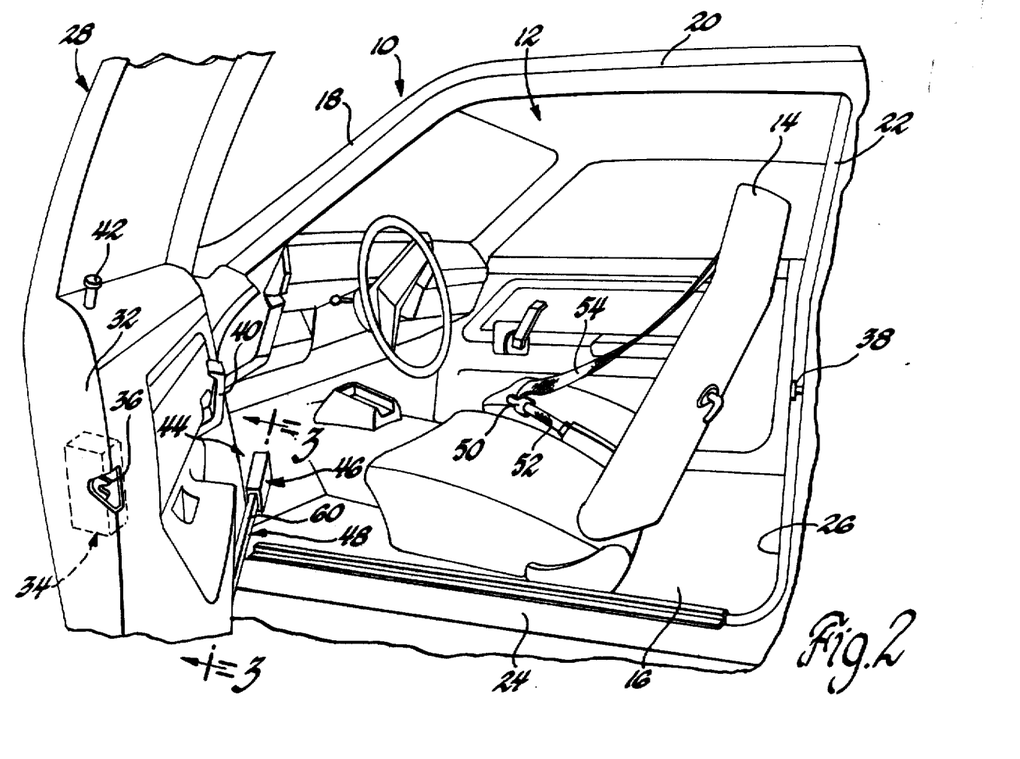
FIG. 2 is a perspective view of the vehicle shown in FIG. 1 but with the buckle slidably moved to an extended position where the buckle is readily accessible to a seated occupant of the vehicle to initiate attachment of the belt latch member to the buckle and use of the associated restraint belt.

Referring generally to FIGS. 1 and 2 of the drawings, a vehicle body generally indicated by 10 includes an occupant compartment 12 with a seat 14 conventionally mounted on the floor 16. FIG. 2 shows that the front windshield pillar 18, the outer roof rail 20, the center lock pillar 22 and the lower rocker structure 24 cooperate to define a door opening generally indicated by 26. A door generally indicated by 28 is pivotally mounted at its forward edge about a generally vertical axis through the front hinge pillar 30, see FIG. 1, by a conventional hinge arrangement that is not shown. The door 28 is movable between the open position shown by these two figures and a closed position where door opening 26 is closed to the outside environment.

FIG. 2 shows that the rear door edge 32 supports a door lock 34 shown by hidden lines. This door lock is like the ones disclosed by the previously mentioned patents, Cockburn U.S. Pat. No. 3,695,663 and Campbell et al U.S. Pat. No. 3,703,308, and is thus of the "uncoupling" type. The door lock includes a forked bolt 36 that is selectively engageable with a keeper 38 mounted on the lock pillar 22 in a conventional manner to maintain the door closed. An inside remote handle 40 on door 28 is connected to the door lock 34 in a conventional manner so that movement of this handle to an actuated position unlatches the bolt 36 to release the keeper 38 and allow opening door movement. FIG. 2 also shows that the upper rear edge of the door supports an inside lock control member 42, commonly referred to as a garnish button. The lock control member 42 is connected to the door lock 34 in a conventional manner to uncouple the door lock from the inside remote handle 40 so that actuating movement of this handle does not unlatch the bolt 36 from keeper 38. Likewise, an unshown outside door handle is similarly connected to the door lock 34 along with an outside key cylinder that also controls the locked or unlocked condition of the door lock. When either the unshown key cylinder or the lock control member 42 locks the door lock 34, both the inside handle 40 and the unshown outside handle are uncoupled from the door lock to prevent unlatching of the bolt 36 from the keeper 38. Likewise, when either the key cylinder or the lock control member 42 lock door lock 34, both handles are coupled to the door lock to permit unlatching thereof and door opening movement.

The conventional vehicle body and door which has thus far been described is utilized with an improved restraint belt arrangement 44, according to this invention. This belt arrangement includes a female buckle 46 that is slidably mounted on door 28 by a slide assembly generally indicated by 48 in FIG. 2. The slide assembly mounts buckle 46 for movement between the retracted position of FIG. 1 and the extended position of FIG. 2 in a manner that will be more fully hereinafter described. Movement of the buckle 46 upwardly and forwardly to its extended position of FIG. 2 positions the buckle inboard of the door for convenient access to an occupant of seat 14. This enables the occupant to grasp the male latch member 50, FIG. 2, and to insert the latch member to within buckle 46 to be secured thereby in a manner that will be described later. This buckling operation causes a lap belt 52 and a shoulder belt 54, whose free ends are both secured to the latch member 50, to be positioned across the occupant when the door 28 is closed. The inboard end of the lap belt 52 is secured to the vehicle floor 16 inboard of seat 14, and the inboard end of shoulder belt 54 is suitably secured to the upper inboard portion of seat 14 or to the adjacent roof structure so that the shoulder belt extends diagonally across the occupant's chest. With the door 28 closed and latch member 50 secured to buckle 46 in the FIG. 2 extended position, subsequent movement of the buckle 46 to the retracted position of FIG. 1 moves the belts 52 and 54 into occupant restraining positions so as to securely position the seated occupant.

Figure 3:
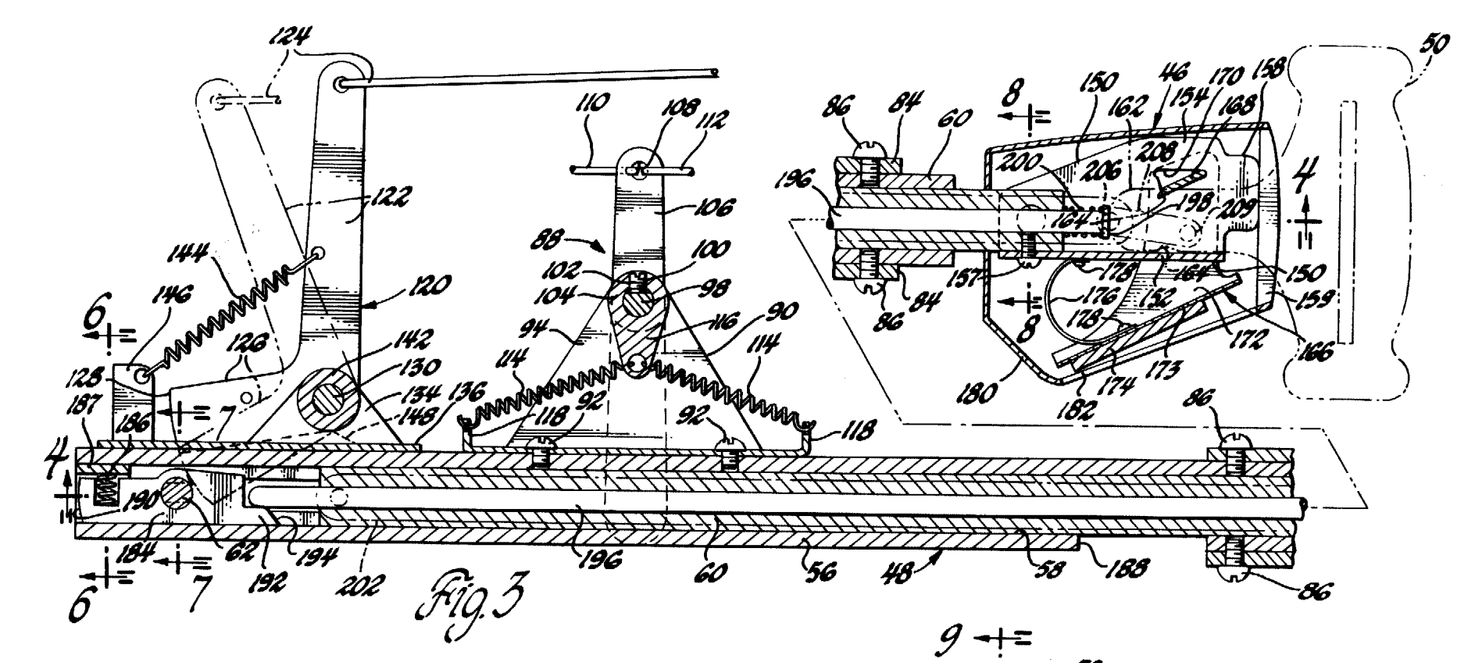
FIG. 3 is an enlarged sectional view taken generally along line 3—3 of FIG. 2 and shows a slide assembly which slidably supports the buckle for its movement, with the buckle being illustrated in this particular view in the retracted position with the belt latch member shown in phantom line illustration secured to the buckle.
Figure 4:
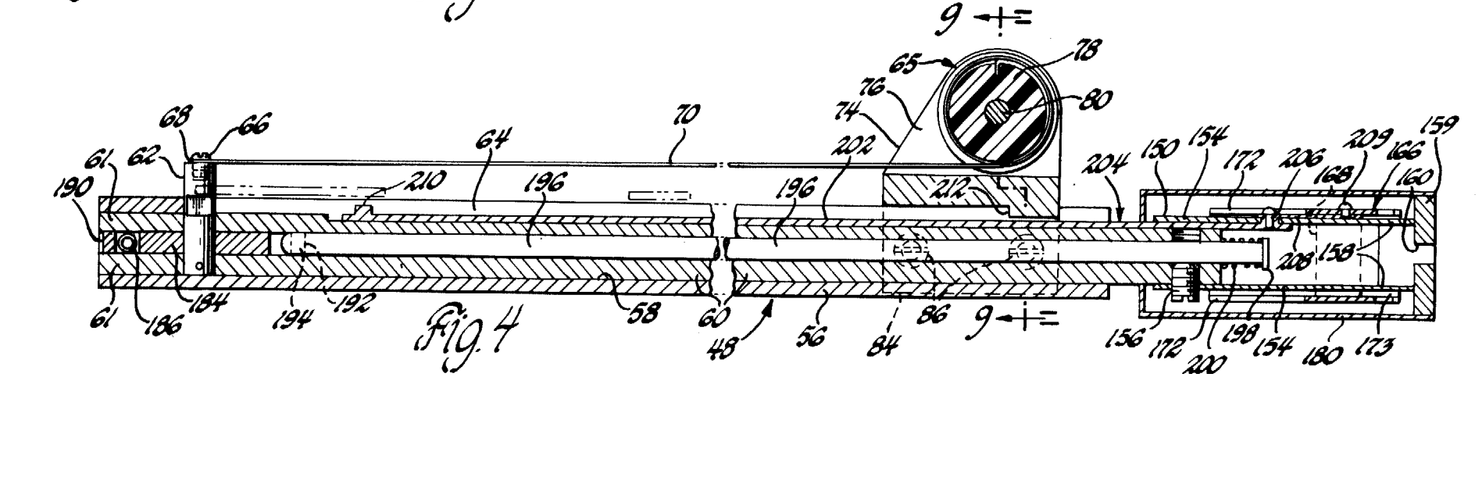
FIG. 4 is a longitudinal sectional view of the slide assembly taken generally along line 4—4 of FIG. 3 and shows a spring reel arrangement which normally biases the buckle to the extended position of FIG. 3.
Figure 6:
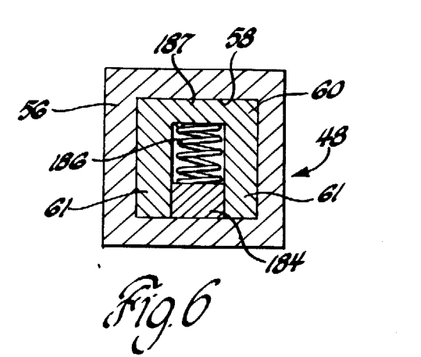
FIGS. 6 and 7 are enlarged cross sectional views of the slide assembly taken respectively along lines 6—6 and 7—7 of FIG. 3 and show the detent which is used to hold the buckle in the extended position prior to securement of the belt latch member to the buckle.
Figure 7:
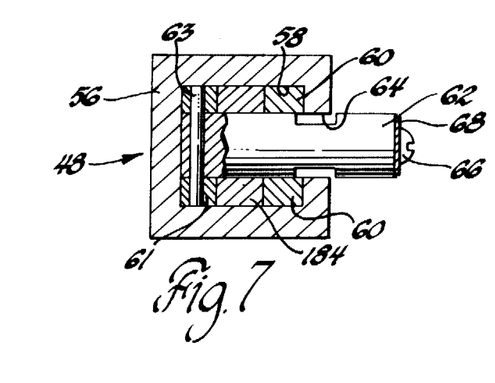

The slide assembly 48 which mounts buckle 46 is shown more fully in FIG. 3 and includes a first telescopic member 56 which is fixedly mounted within the door 28 in any suitable manner. This first telescopic member 56 has a generally elongated configuration with a square cross section shown in FIGS. 6 and 7, and defines an elongated internal groove 58 with a square cross section. A second elongated telescopic member 60 of a square cross section is slidably received within the groove 58 in telescopic member 56 so as to be movable between the retracted position of FIG. 3 and the extended position of FIG. 5. The right-hand end of telescopic member 60 supports the female buckle 46 in a manner which will be more fully described later. The left-hand end of telescopic member 60 fixedly supports a pin 62 that projects outwardly through an elongated slot 64 along one edge of telescopic member 56 as can be seen in FIGS. 4 and 7. This end of member 60 is bifurcated and defines spaced portions 61 seen in FIGS. 4 and 7. An attachment pin 63, FIG. 7, secures pin 62 to one of the spaced portions 61.

Figure 9:
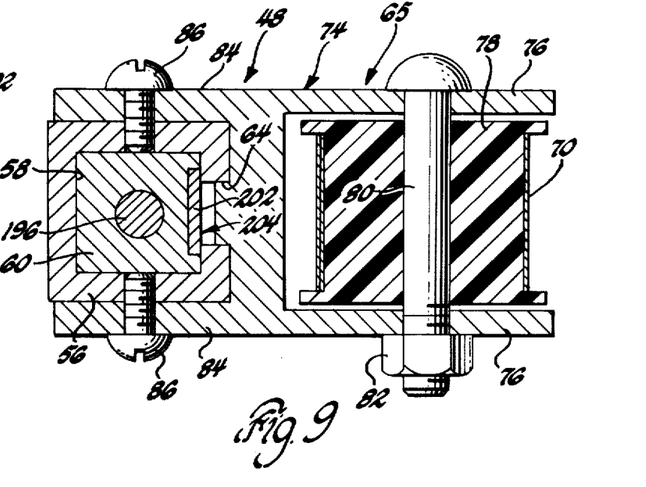
FIG. 9 is an enlarged sectional view of the slide assembly taken generally along line 9—9 of FIG. 4 and shows the cross section of the spring reel arrangement which biases the buckle to the extended position.

A spring reel arrangement 65, FIG. 4, receives a flat spring and a screw 66 attaches one spring end 68 to the outer end of pin 62. The flat spring is indicated by 70 and its other end is winding received by the reel arrangement, as shown by both FIGS. 4 and 9. With reference to FIG. 9, the reel arrangement 65 includes a bracket 74 with spaced ears 76 located on opposite sides of a reel 78 that receives the spring 70. The reel 78 is rotatably supported by a bolt shaft 80 that extends between the ears 76 and is secured in position by a nut 82. The bracket 74 also includes spaced mounting ears 84 located on opposite sides of the first telescopic member 56 and secured thereto by screws 86. The spring 70 is of the type which normally assumes a wound configuration, and this causes the spring 70 to thus urge pin 62 to the right so as to bias the buckle 46 to its extended positions of FIGS. 2 and 5.

Figure 5:
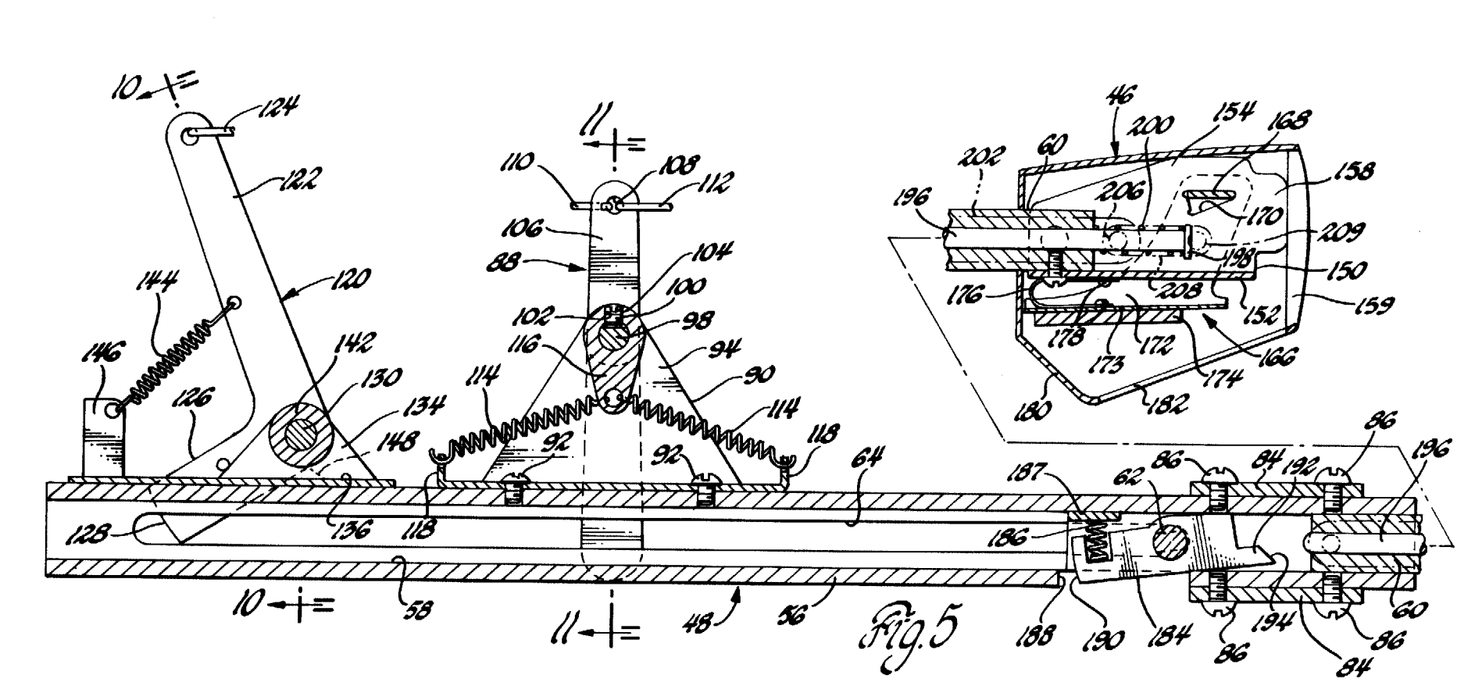
FIG. 5 is a sectional view of the slide assembly similar to that of FIG. 3 but shows the slide assembly positioning the buckle in the extended position where a releasable detent prevents movement thereof back to the retracted position prior to buckling of the latch member to the buckle.
Figure 11:
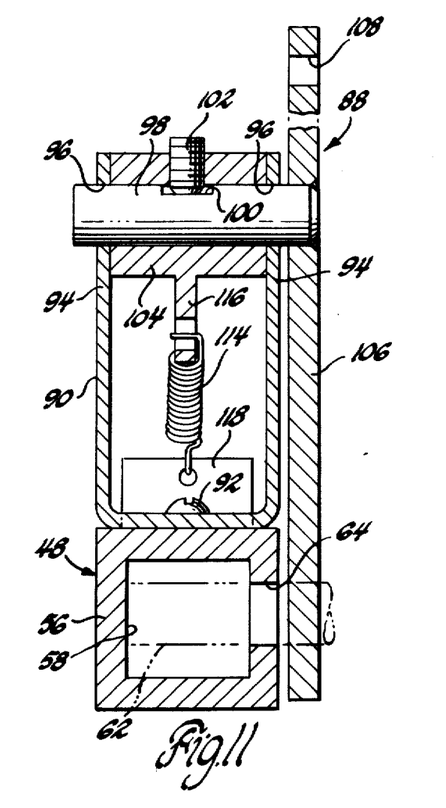
FIG. 11 is an enlarged sectional view of the slide assembly taken along line 11—11 of FIG. 5 and shows a connecting arrangement that controls the locked or unlocked condition of the door lock associated with the illustrated door in response to the position of the buckle in its retracted or extended position.

As the buckle 46 moves between its retracted and extended positions, the pin 62 slides between the left and righthand ends of the elongated slot 64 in telescopic member 56. The pin 62 is cooperable as it slides with a connecting arrangement, generally indicated by 88 in FIGS. 3, 5 and 11, located along the length of telescopic member 56 and operable to control the locked or unlocked condition of door lock 34. As seen in these referenced Figures, the connecting arrangement 88 includes a bracket 90 mounted on the first telescopic member 56 in any suitable manner such as by screws 92. This bracket 90 includes upwardly extending spaced ears 94 whose upper ends define apertures 96, FIG. 11, which receive a shaft 98. This shaft includes a central flat 100 that is engaged by a screw 102 of a control bushing 104. The control bushing 104 is located on shaft 98 between the ears 94 of bracket 90 and is fixed to the shaft against rotation by the engaged condition of flat 100 and screw 102. The FIG. 11 righthand end of shaft 98 fixedly supports the upper end of a link 106 whose lower end extends downwardly adjacent the slot 64 through which pin 62 projects. The extreme upper end of link 106 defines an aperture 108 which, as seen in FIGS. 3 and 5, is connected to cables 110 and 112. These cables are connected to the door lock 34 so as to provide locking and unlocking thereof in a manner that will be hereinafter described.

The connecting arrangement 88 also includes a pair of helical springs 114 arranged in a generally V-shaped configuration, FIGS. 3 and 5, with their adjacent ends hooked to an apertured lug 116 extending downwardly from the control bushing 104 on shaft 98. The other ends of the springs 114 are hooked through upwardly extending apertured tabs 118 of bracket 90 and normally bias the control bushing 104 to a rotational position that locates the link 106 in the vertical position shown. These springs 114 allow the link 106 to be rotated in opposite directions as pin 62 engages the lower end of this link during movement of buckle 46 between the retracted and extended positions, but return the link to its vertical position after this movement has taken place. As the buckle 46 is being retracted so that pin 62 engages the link 106 moving from the right to the left, as in FIGS. 3 and 5, link 106 rotates clockwise about shaft 98 and pulls cable 110. Cable 110 is connected either directly to the door lock 34 or to the lock control member 42 which is in turn connected to the door lock and, regardless which type of connection is used, the pull of cable 110 as the buckle 46 is retracted positions the door lock in its locked condition. Thus, the door lock 34 is automatically locked when the buckle is moved to its retracted position without any deliberate effort of the belt user. When the pin 62 engages the lower end of link 106 moving from the left to the right as the buckle 46 is being extended, the link is rotated counterclockwise about the shaft 98 so that cable 112 is pulled. This cable 112 is also connected either directly to the door lock 34 or indirectly through the lock control member 42, and its pull moves the door lock to an unlocked condition. Thus, the door lock 34 is automatically unlocked as the buckle 46 is extended without any deliberate effort on the part of the occupant. Retracting and extending movement of the buckle 46 thus automatically locks and unlocks the door lock 34 as the buckle moves without any deliberate effort on the part of the occupant seated within seat 14.

Figure 10:
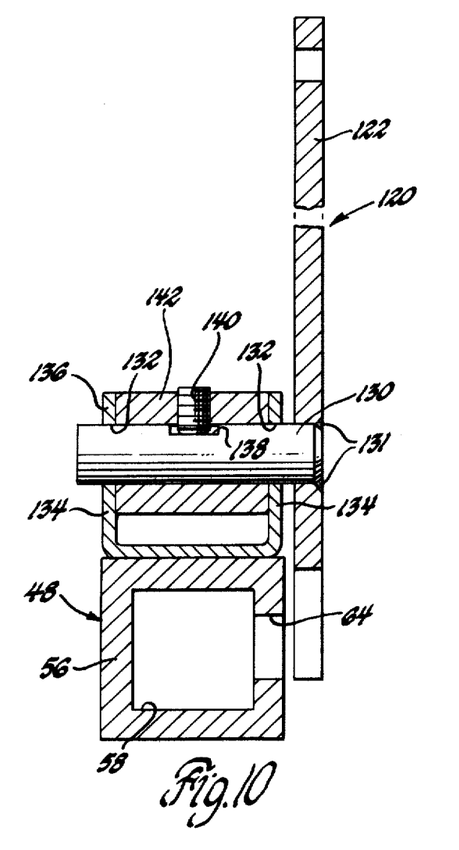
FIG. 10 is an enlarged sectional view taken through the slide assembly along line 10—10 of FIG. 5 and shows a releasable detent that selectively holds the buckle in the retracted position of FIG. 3.

A releasable detent 120 is mounted on the left-hand end of slide assembly 48 as viewed in FIGS. 3 and 5, and is operable to hold the buckle 46 in its retracted position so as to secure the belt arrangement 44 in the occupant restraining position. The detent 120 has a bellcrank configuration with a longer leg 122 whose upper end attaches a cable 124 connected to the inside remote handle 40 of door 28. The detent 120 also has a shorter leg 126 with a locking surface 128. At the juncture of its longer and shorter legs, a shaft 130 is fixedly secured to the detent in any suitable manner such as by weld 131, see FIG. 10. This shaft 130 extends through apertures 132 in the side walls 134 of a channel member 136 suitably mounted on telescopic member 56, as also seen in FIG. 10, and a central flat 138 of shaft 130 is engaged by a screw 140 of a bushing 142 located on the shaft between the sidewalls 134 of this channel member. A helical spring 144, seen in FIGS. 3 and 5, is attached to an intermediate portion of detent leg 122 and to a tab 146 of channel member 136, and this spring biases the detent 120 counterclockwise about shaft 130 to the phantom line indicated position of FIG. 3. A stop 148 on channel member 136 engages the lower side of the shorter detent leg 126 to limit the degree of this counterclockwise rotation.

As the buckle 46 is moved from its extended position of FIG. 5 toward its retracted position of FIG. 3, pin 62 moves to the left along the slot 64 in telescopic member 56 and thus moves toward detent 120. After first engaging the link 106 of connecting arrangement 88 and locking the door lock 34 in the manner previously described, the pin 62 engages the lower side of detent leg 126 and moves the detent clockwise against the bias of spring 144 as it moves to the left. After passing to the left of the locking surface 128 on the shorter detent leg 126, the bias of spring 144 returns the detent 120 to the phantom line indicated locked position and captures the pin 62 between locking surface 128 and the end of slot 64. The detent 120 thereby locks the first telescopic member in its retracted position with buckle 46 retracted against the bias of the spring 70 that tends to return the buckle to the extended position.

Actuation of the inside remote handle 40 causes cable 124 to pull the detent leg 122 to the right and to thereby pivot the detent clockwise so that the shorter detent leg 126 frees pin 62 for movement of the buckle 46 in the extending direction. Since the door lock 34 is of the "uncoupling" type and the door lock 34 is in the locked condition with the buckle 46 in retracted position, the first actuation of inside remote handle 40 does not unlatch the door lock but merely provides this release of buckle 46 for movement to its extended position. As the buckle 46 continues to be extended under the bias of spring 70, pin 62 engages the link 106 of connecting arrangement 88 and rotates this link counterclockwise so that cable 112 pulls on the door lock and moves it to an unlocked condition. The second actuation of the inside remote handle 40 then unlatches the door lock 34 to allow opening door movement.

Figure 8:
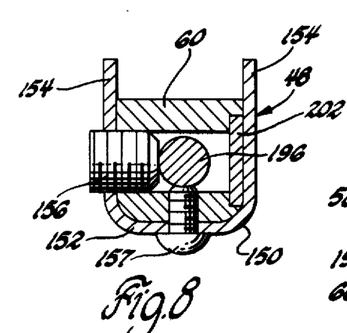
FIG. 8 is an enlarged sectional view through the buckle and slide assembly taken generally along line 8—8 of FIG. 3 and illustrates a push rod that extends between the buckle and the detent shown in FIGS. 5 through 7 so as to provide a connecting arrangement that releases the detent upon securement of the belt latch member to the buckle.

The buckle 46 that receives and secures the latch member 50 attached to lap and shoulder belts 52 and 54 is shown in detail in FIGS. 3 through 5. The buckle includes a U-shaped bracket 150 with a base wall 152 having side walls 154 extending therefrom in a spaced relationship. The left-hand end of this bracket 150, as viewed in FIGS. 3 through 5, is connected to the outer right-hand end of the second telescopic member 60 of slide arrangement 48 by a pair of screws 156 and 157, see this connection also in FIG. 8. The right-hand end of this bracket, as viewed in FIGS. 3 through 5, includes spaced tabs 158 that are suitably connected to an escutcheon 159 which defines a latch member opening 160, see FIG. 4. The latch member 50 includes a locking nose 162, see FIG. 3, which is inserted through this opening 160 so as to secure the latch member to the buckle 46. This locking nose 162 of latch member 50 includes a pair of notches 164 that face to the right in FIG. 3.

A locking member of buckle 46 is generally indicated by 166 and includes a locking portion 168 that extends through wedge shaped apertures 170 in the spaced walls 154 of bracket 150. This locking member 166 also includes spaced walls 172, located above and below the spaced walls 154 of brackets 150, as viewed in FIG. 4, and walls 172 are connected to the opposite ends of locking portion 168. A base wall 173 of locking member 166 extends between the side walls 172 and supports a button 174. A leaf spring 176 has its opposite ends secured to the bracket 150 and the locking member 166 by rivets 178, as seen in FIGS. 3 and 5.

Spring 176 biases locking member 166 counterclockwise to the position of FIG. 3. Thus, as the locking member 50 is inserted within buckle 46, its nose 162 receives the locking portion 168 in one of the notches 164 so as to capture the nose between this locking portion and the base wall 152 of the bracket 150. The button 174 may be manually depressed to rotate the locking member 166 against the bias of leaf spring 176 to the FIG. 5 unlocked position where the nose 162 of latch member 50 is free of the locking portion 168 so as to be removable from the buckle. A decorative housing 180 extends between the escutcheon 159 and the right-hand end of telescopic member 60 to provide the buckle with an aesthetically appealing appearance, and defines an aperture 182, FIGS. 3 and 5, through which button 174 is manually accessible to allow the release of latch member 50.

A detent 184 is mounted on the left-hand end of the second telescopic member 60 between its spaced end portions 61 in a pivotal manner by pin 62. This mounting is shown in FIGS. 3 through 5 and 7. As seen in FIGS. 3 and 5, a helical spring 186 has one end seated by an extreme left-hand end portion 187 of telescopic member 60. This portion 187 bridges the space between the spaced ends 61 of member 60, see FIG. 6. The other end of spring 186 engages the detent 184 so as to bias it in a counterclockwise direction. When the buckle 46 is moved to the extended position and the latch member 50 is released from the buckle, as will be described later, the detent 184 is located adjacent an aperture in the first telescopic member 56. This aperture defines an edge 188 that is engageable with an edge 190 of detent 184, see FIG. 5, to prevent the buckle from being returned to the retracted position until the detent is subsequently moved back to the position shown by FIG. 3 against the bias of spring 186. The pin 62 limits the movement of telescopic member 60 to the right by engagement with the right-hand end of slot 64 in telescopic member 56. The bias of spring reel arrangement 65 maintains this engagement so that there is a slight spacing between the detent edge 190 and the telescopic member edge 188, FIG. 5. Thus, member 60 and buckle 46 may be moved just slightly to the left before these edges are engaged to limit further movement to the left. The purpose of this limited movement will be described later as will be the function of a nose 192 with a camming edge 194 on the right-hand end of detent 184.

A push rod 196 extends between the buckle 46 and detect 184 to provide a connecting arrangement therebetween. This push rod 196 is slidably mounted within the second telescopic member 60 along the longitudinal length thereof, as can be seen by FIG. 9. The right-hand end of the push rod 196, as viewed in FIGS. 3 through 5, includes a head portion 198 that seats one end of a helical spring 200 which encircles the push rod. The other end of spring 200 is seated against the right-hand end of the second telescopic member 60 and this spring biases the push rod to the right as shown by FIG. 5. When the latch member 50 is inserted to within buckle 46, its nose 162 engages the head portion 198 of push rod 196 and moves the push rod to the left to compress spring 200 in the manner shown by FIG. 3. This causes the left-hand end of push rod 196 to engage the camming edge 194 of detent 184 and to pivot the detent clockwise while moving over its nose 192, and the detent thus moves into alignment with the internal groove 58 in telescopic member 56 free of its edge 188 for movement to the left. Thus, buckle 46 may then be moved against the bias of the spring reel arrangement 65 to the retracted position where detent 120 maintains the buckle by engagement with pin 62 in the manner previously described.

FIGS. 3 through 5 and 9 disclose an elongated control member 202 of a release arrangement generally indicated by 204. The FIGS. 3 through 5 right-hand end of this control member 202 is pivoted by a pin 206 to one end of a link 208. The other end of link 208 is pivoted to one of the walls 172 of locking member 166 by a pin 209. The link 208 is slightly misaligned with the elongated axis of control member 202 when the latch member 50 is secured to buckle 46 as shown in FIG. 3. The left-hand end of the control member 202 includes a projection 210, see FIG. 4, which slides in the elongated slot 64 of telescopic member 56. A stop surface 212, FIG. 4, carrier by the bracket 74 of reel arrangement 65 engages this projection 210 as the buckle 46 is moved to its extended position under the bias of the spring reel arrangement. The bias of spring 70 of this arrangement is stronger than the bias of the leaf spring 176 associated with locking member 166 and the engagement between projection 210 and stop surface 212 thus causes the control member 202 to remain stationary during a final limited amount of the buckle extending movement so that locking member 166 is pulled to the unlocked position of FIG. 5 as link 208 is pulled into alignment with the elongated axis of the control member 202. The latch member 50 is thus automatically released from buckle 46 during this limited movement as the buckle reaches its extended position, and the bias of spring 200 moves the push rod 196 to the right to eject the latch member 50 from the buckle and concomitantly move the left-hand end of the push rod out of engagement with the nose 192 on detent 184. Consequently, the detent 184 moves counterclockwise under the bias of spring 186 into the detenting position shown by FIG. 5, and thereby prevents retracting movement of buckle 46 by engagement with the telescopic member edge 188.

As the latch member 50 is inserted within the buckle 46, the buckle is manually moved slightly toward retracted position to a degree sufficient to permit the leaf spring 176 to move the locking member 166 to the locking position securing the latch member. This is possible due to the slight spacing between the detent edge 190 and the telescopic member edge 188, as shown in FIG. 5. Without this slight retracting buckle movement, the control member 202 and link 208 would maintain the locking member 166 in its FIG. 5 nonlocking position and attachment of latch member 50 would not be achieved.

The foregoing description is believed to adequately describe the improved restraint belt arrangement of the present invention.

What is claimed is:

1. In a vehicle body including a door movable between open and closed positions laterally adjacent a seat and having a door lock for holding the door in closed position, a restraint belt arrangement for restraining an occupant of the seat, the belt arrangement comprising:

a restraint belt having one end secured adjacent an inboard portion of the seat and having a male latch member secured to the other end thereof;

a female buckle for selectively receiving and securing the latch member, the buckle being actuatable to release the latch member;

a slide assembly mounted on the door and supporting the buckle for movement between retracted and extended positions relative thereto, the retracted buckle being positioned in a lower rearward position relative to a seated occupant when the door is closed so that the buckle secures the latch member at a location positioning the restraint belt in an occupant restraining position across this occupant, the extended buckle being located upwardly and forwardly from the retracted buckle so as to be readily accessible to the seated occupant for receiving the latch member;

means on the slide assembly for normally biasing the buckle to the extended position so as to facilitate access of the occupant to the buckle for securement of the latch member thereto; and a releasable detent on the slide assembly for holding the buckle in the retracted position upon movement thereto so as to thereby secure the belt in the restraining position when the latch member is secured to the buckle, the detent being released to allow the buckle bias to return the buckle to extended position for convenient access to the occupant.

2. In a vehicle body including a door movable between open and closed positions laterally adajcent a seat, an uncoupling type door lock on the door for latching the door to the body in closed position, an inside remote handle connected to the door lock and movable to an actuated position to provide unlatching of the door lock so that opening door movement is possible, and an inside lock control member movable between an unlocked position where the inside remote handle is connected to the door lock to permit unlatching thereof and a locked position where the door lock is uncoupled from the handle so that actuating movement thereof does not unlatch the door lock, a restraint belt arrangement for restraining an occupant of the seat comprising:

a restraint belt secured to a portion of the vehicle inboard of the seated occupant and having a male latch member secured to a free end thereof;

a female buckle for selectively receiving and securing the latch member, the buckle being actuatable to release the latch member;

a slide assembly mounted on the door and supporting the buckle for movement between retracted and extended positions relative thereto, the retracted buckle being positioned in a lower rearward position relative to the seated occupant when the door is closed so that the buckle secures the latch member at a location positioning the restraining belt in an occupant restraining position across this occupant, the extended buckle being located upwardly and forwardly from the retracted buckle so as to be readily accessible to the seated occupant for receiving the latch member;

a spring on the slide assembly normally biasing the buckle to the extended position so as to facilitate securement of the latch member to the buckle;

a releasable detent on the slide assembly for holding the buckle in the retracted position upon movement thereto so as to thereby secure the belt in the occupant restraining position when the latch member is secured to the buckle; and a connecting arrangement extending between the inside remote handle and the detent so as to release the detent upon movement of the handle to the actuated position and thereby allowing the spring to return the buckle to the extended position where the buckle is readily accessible.

3. In a vehicle body including a door movable between open and closed positions laterally adjacent a seat, an uncoupling type door lock on the door for latching the door to the body in closed position, an inside remote handle connected to the door lock and movable to an actuated position to provide unlatching of the door lock so that opening door movement is possible, and an inside lock control member movable between an unlocked position where the inside remote handle is connected to the door lock to permit unlatching thereof and a locked position where the door lock is uncoupled from the handle so that actuating movement thereof does not unlatch the door lock, a restraint belt arrangement for restraining an occupant of the seat comprising:

a restraint belt secured to a portion of the vehicle inboard of the seated occupant and having a male latch member secured to a free end thereof;

a female buckle for selectively receiving and securing the latch member, the buckle being actuatable to release the latch member;

a slide assembly mounted on the door and supporting the buckle for movement between extended and retracted positions relative thereto, the retracted buckle being positioned in a lower rearward position relative to the seated occupant when the door is closed so that the buckle secures the latch member at a location positioning the restraint belt in an occupant restraining position across this occupant, the extended buckle being located upwardly and forwardly from the retracted buckle so as to be readily accessible to the seated occupant for receiving the latch member;

a spring on the slide assembly normally biasing the buckle to the extended position so as to facilitate securement of the latch member to the buckle;

a first releasable detent on the slide assembly for holding the buckle in the retracted position upon movement thereto so as to thereby secure the belt in the occupant restraining position when the latch member is secured to the buckle;

a first connecting arrangement extending between the inside remote handle and the first detent so as to release the first detent upon movement of the handle to the actuated position and thereby allowing the spring to return the buckle to the extended position where the buckle is readily accessible; and a second releasable detent on the slide assembly for holding the buckle in the extended position upon movement thereto so as to maintain the buckle accessible to the occupant; and a second connecting arrangement extending between the second detent and the buckle so as to release the second detent upon securement of the latch member to the buckle and to thereby allow a manual effort to move the buckle to the retracted position against the bias of the spring so the belt is positioned in the occupant restraining position.

4. In a vehicle body including a door movable between open and closed positions laterally adajcent a seat, an uncoupling type door lock on the door for latching the door to the body in closed position, an inside remote handle connected to the door lock and movable to an actuated position to provide unlatching of the door lock so that opening door movement is possible, and an inside lock control member movable between an unlocked position where the inside remote handle is connected to the door lock to permit unlatching thereof and a locked position where the door lock is uncoupled from the handle so that actuating movement of the handle does not unlatch the door lock, a restraint belt arrangement for restraining an occupant of the seat comprising:

a restraint belt secured to a portion of the vehicle inboard of the seated occupant and having a male latch member secured to a free end thereof;

a female buckle for selectively receiving and securing the latch member, the buckle being actuatable to release the latch member;

a slide assembly including a first telescopic member mounted on the door and a second telescopic member which mounts the buckle and is slidable within the first telescopic member so as to mount the buckle for movement between retracted and extended positions relative to the door, the retracted buckle being positioned in a lower rearward position relative to the seated occupant when the door is closed so that the buckle secures the latch member at a location positioning the restraint belt in an occupant restraining position across this occupant, the extended buckle being located upwardly and forwardly from the retracted buckle so as to be readily accessible to the seated occupant for receiving the latch member;

a spring on the slide assembly normally biasing the buckle to the extended position so as to facilitate securement of the latch member to the buckle;

a first releasable detent on the slide assembly for selectively holding the buckle in the retracted position upon movement thereto so as to thereby secure the belt in the occupant restraining position when the latch member is secured to the buckle;

a first connecting arrangement extending between the inside remote handle and the first detent so as to release the first detent upon movement of the handle to the actuated position and thereby allowing the spring to return the buckle to the extended position where the buckle is readily accessible; and a second releasable detent on the slide assembly for holding the buckle in the extended position upon movement thereto so as to maintain the buckle accessible to the occupant;

a second connecting arrangement extending between the second detent and the buckle so as to release the second detent upon securement of the latch member to the buckle and to thereby allow a manual effort to move the buckle to retracted position against the bias of the spring so the belt is positioned in the occupant restraining position; and a third connecting arrangement extending between the slide assembly and the door lock and responsive to the buckle movement to retracted position so as to uncouple the door lock from the inside remote handle to prevent unlatching of the door lock, the third connecting arrangement being responsive to movement of the buckle to the extended position so as to again connect the door lock to the inside remote handle to permit unlatching of the door lock.

5. In a vehicle body including a door movable between open and closed positions laterally adjacent a seat, an uncoupling type door lock on the door for latching the door to the body in closed position, an inside remote handle connected to the door lock and movable to an actuated position to provide unlatching of the door so that opening door movement is possible, and an inside lock control member movable between an unlocked position where the inside remote handle is connected to the door lock to permit unlatching thereof and a locked position where the door lock is uncoupled from the handle so that actuating movement thereof does not unlatch the door lock, a restraint belt arrangement for restraining an occupant of the seat comprising:

a restraint belt secured to a portion of the vehicle inboard of the seat occupant and having a male latch member secured to a free end thereof;

a female buckle for selectively receiving and securing the latch member, the buckle being actuated to release the latch member therefrom;

a slide assembly mounted on the door and supporting the buckle for movement between retracted and extended positions relative thereto, the retracted buckle being located in a lower rearward position relative to the seated occupant when the door is closed so that the buckle secures the latch member at a location positioning the restraint belt in an occupant restraining position across this occupant, the extended buckle being located upwardly and forwardly from the retracted buckle so as to be readily accessible to the seated occupant for receiving the latch member;

a spring on the slide assembly normally biasing the buckle to the extended position so as to facilitate securement of the latch member to the buckle;

a releasable detent on the slide assembly for holding the buckle in the retracted position upon movement thereto so as to thereby secure the belt in the occupant restraining position when the latch member is secured to the buckle;

a connecting arrangement extending between the inside remote handle and the detent so as to release the detent upon movement of the handle to the actuated position and thereby allowing the spring to return the buckle to the extended position where the buckle is readily accessible; and    a release arrangement extending between the buckle and the slide assembly so as to automatically actuate the buckle when the slide assembly returns the buckle to the extended position so as to thereby release the latch member from the buckle to free the occupant of the restraint belt.

* * * * *